Inventor
ROBERT HASKINS,

Aug. 16, 1955  R. HASKINS  2,715,707
AUTOMATIC MOTOR CONTROL FOR VARYING PROPELLER PITCH
Filed Dec. 20, 1950  6 Sheets-Sheet 2

Inventor
ROBERT HASKINS,
By Stone, Boyden & Mack.
Attorneys.

Aug. 16, 1955  R. HASKINS  2,715,707
AUTOMATIC MOTOR CONTROL FOR VARYING PROPELLER PITCH
Filed Dec. 20, 1950  6 Sheets-Sheet 5

Inventor
ROBERT HASKINS,
By Stone, Boyden & Mack
Attorneys.

Aug. 16, 1955 R. HASKINS 2,715,707
AUTOMATIC MOTOR CONTROL FOR VARYING PROPELLER PITCH
Filed Dec. 20, 1950 6 Sheets-Sheet 6

Inventor
ROBERT HASKINS,

By *Stone, Boyden & Mack*
Attorneys

United States Patent Office 2,715,707
Patented Aug. 16, 1955

2,715,707

AUTOMATIC MOTOR CONTROL FOR VARYING PROPELLER PITCH

Robert Haskins, Richmond, Va., assignor to Flight Research, Incorporated, a corporation of Virginia Application December 20, 1950, Serial No. 201,795

19 Claims. (Cl. 318—283)

This invention relates to automatic control systems and particularly to automatic constant speed governors for aircraft and like engines driving controllable pitch propellers, wherein control of the engine speed is attained by varying the propeller pitch in response to engine speed error.

An automatic constant speed governor of the general type to which the present invention is directed is disclosed in co-pending application, Serial Number 162,475, filed May 17, 1950, by Robert Haskins. As in said co-pending application, the present invention employs a dual photoelectric cell system to control the propeller pitch changing motor in response to the position of a light vane moved by an engine speed error detector.

A primary novel feature of the present invention is the provision, in such a system, of an oscillatable mask for cyclically interrupting the flow of light to the photoelectric cells in such a manner as to convert the operation of the photoelectric system from a simple "on-off" controlling action to a substantially proportional controlling action. That is, the function of the mask is such that actuation of the pitch changing motor by the photoelectric cell system is made substantially proportional to the engine speed error detected.

In a preferred embodiment of the invention, the operation of the mask is such that actuation of the pitch changing motor is made continuous when the speed error is relatively large but is cyclically interrupted when the speed error approaches zero.

Yet another important feature of the invention is the provision of means, combined with the driving means for oscillating the interrupting mask, for preventing the contacts of the control relays for the pitch changing motor from sticking.

In order that these and other features of the invention may be understood in detail, reference is had to the accompanying drawings which form a part of this specification and wherein.

Figure 1:
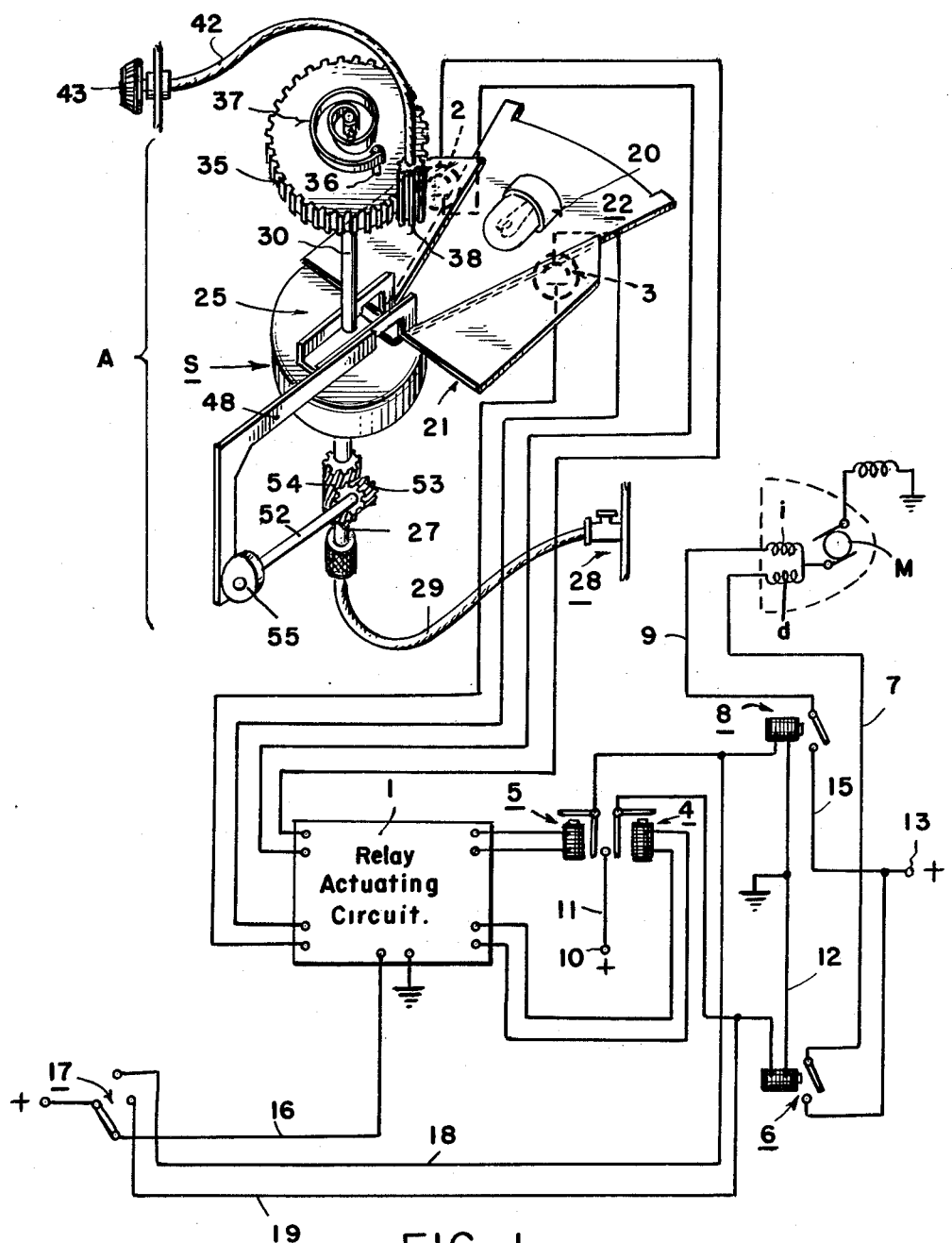
Fig. 1 is a diagrammatic illustration of an automatic constant speed governor constructed in accordance with one embodiment of the invention.

Referring now to the drawings, it will be seen that Fig. 1 illustrates diagrammatically a constant speed governor for an aircraft engine, the governor including an engine speed error detector A employed to selectively energize the increase and decrease windings $i$, $d$, respectively, of the reversible electrical propeller pitch changing motor M, through a photoelectric cell controlled relay system. A relay actuating circuit 1, hereinafter described in detail, is controlled by the photoelectric cells 2 and 3 to energize the winding of a normally open relay 4 when the cell 2 is activated, and to energize the winding of a second normally open relay 5 when the cell 3 is activated. The relay 4 controls a normally open power relay 6 having contacts in the supply conductor 7 for the decrease winding $d$, and the relay 5 controls a normally open power relay 8 having contacts in the supply conductor 9 for the increase winding $i$, as shown.

When the photoelectric cell 2 is activated, the relay actuating circuit 1 operates to close the relay 4, completing a circuit comprising a power terminal 10, the conductor 11, the winding of the power relay 6, the conductor 12 and ground. The winding of the power relay 6 thus being energized, the pitch motor decrease winding $d$ is supplied through conductor 7 from the power terminal 13, and the motor M operates to decrease the propeller pitch and reduce the load on the engine. When the cell 3 is activated, the circuit 1 operates to close the relay 5, completing a circuit comprising the terminal 10, a conductor 11, the winding of power relay 8, and a conductor 15 to ground. The winding of power relay 8 being energized, the pitch increase winding $i$ is supplied through the conductor 9 from the power terminal 13, and the motor M operates to increase the propeller pitch and increase the load on the engine.

The relay actuating circuit 1 is supplied from a suitable power source, which may be the same source employed to energize the power relay windings, by a circuit comprising a conductor 16 and ground. A manual switch 17, located on the instrument panel of the aircraft, is provided to make and break the supply to the circuit 1. The manual switch 17 is preferably a 3-position switch, the remaining two contact positions thereof being employed for selective manual control of the power relays 6 and 8 via the conductors 18 and 19, respectively, as shown. Thus, the switch 17 can be used either to activate the relay actuating circuit 1, or to selectively energize either power relay to the exclusion of the automatic control.

Figure 8:
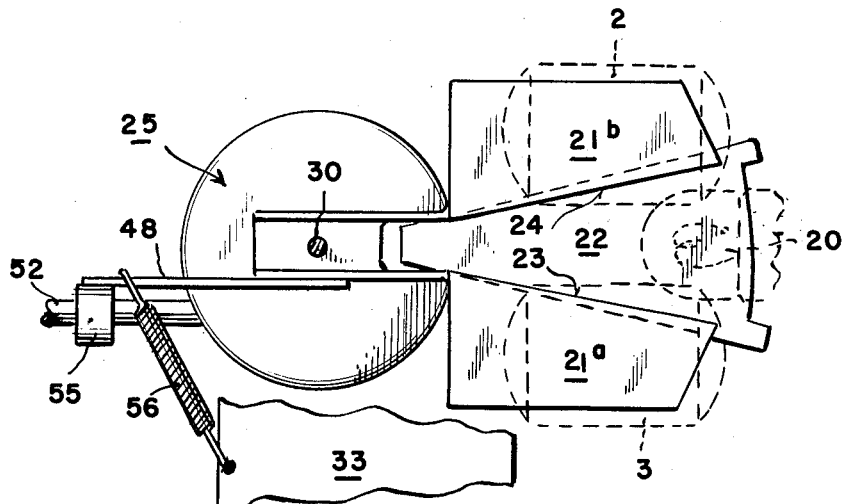
Fig. 8 is a plan view showing the relation of the light vane and mask when said elements are centered relative to the photoelectric cells of the governor shown in Fig. 1.
Figure 4:
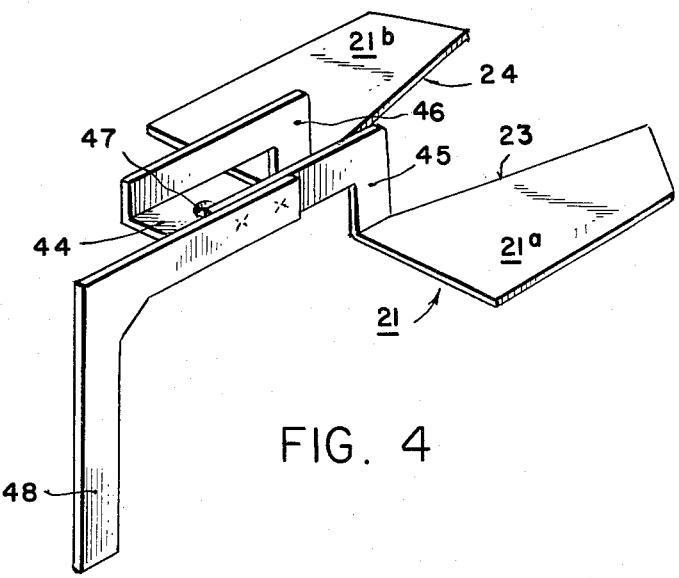
Fig. 4 is a perspective view of an oscillatory mask employed in the governor shown in Fig. 1.

The speed error detector A includes a light source 20, such as a conventional incandescent lamp, to provide light to activate the cells 2 and 3, and a pair of opaque shutter members 21 and 22 interposed between the light source and the cells and capable of oscillatory motion transversely of the line of travel of the light from the source 20 to the cells 2 and 3. The shutter member 21, shown in detail in Fig. 4, is in the form of a mask having an opening defined by the edges 23 and 24, said opening being of such a size that, when the mask is centered relative to the cells 2 and 3, light from the source 20 can pass through the opening of the mask to both of the cells. The shutter member 22 constitutes a light vane positioned parallel with and close to the mask 21. As seen in Figs. 1 and 8, the vane 22 is wider than the opening of the mask 21, so that when both the mask and the vane are centered relative to the photoelectric cells, light from the source 20 is prevented from passing to either of the cells.

Figure 5:
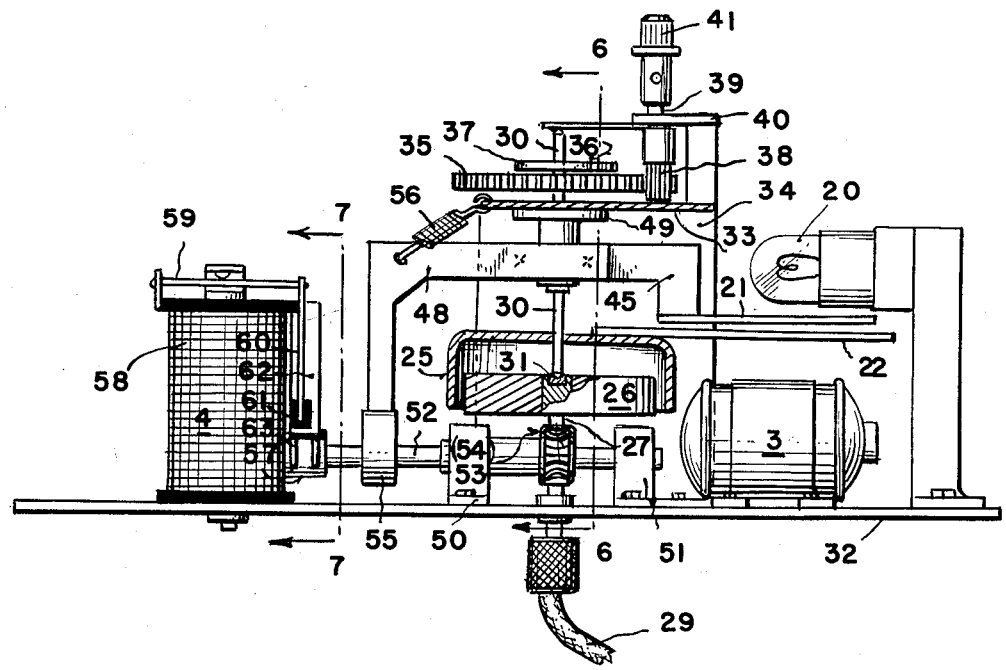
Fig. 5 is a vertical elevational view, partly in vertical section, of the speed error detecting mechanism of the governor shown in Fig. 1.
Figure 3:
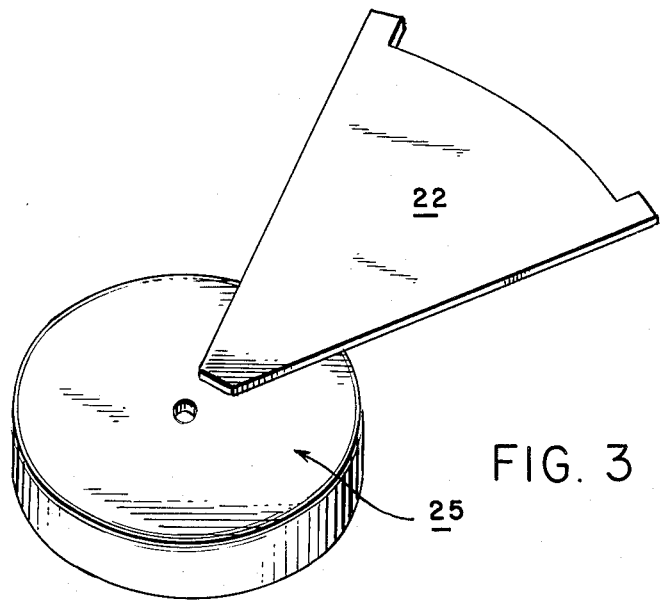
Fig. 3 is a perspective view of an oscillatable control element and light vane employed in the governor illustrated in Fig. 1.

As seen in Figs. 3 and 5, the light vane 22 is carried by the drag cup 25 of a conventional eddy current speed sensor S. The rotary magnet 26 of the speed sensor is mounted on a shaft 27 driven from the tachometer pad 28 of the aircraft engine by a flexible shaft 29, the rotation of the magnet drive being such that the turning of the magnet applies to the drag cup 25 a deflecting force in a direction tending to laterally displace the vane 22 to expose the photoelectric cell 3 to light from the source 20.

The drag cup 25 is carried by a shaft 30 seated at one end in a suitable bearing 31 in the end of the magnet shaft 27. The shaft 27 is journalled in a suitable base panel 32, Fig. 5, and the shaft 30 is positioned at right angles to the panel by means of a suitable bearing in a bearing plate 33 mounted above the panel 32 by means of uprights 34. Supported on the upper surface of the bearing plate 33 and arranged for rotation about the shaft 30 as an axis is a speed range selector gear 35. The gear 35 carries on its upper surface a pin 36 connected to the outer end of a hairspring 37, the central end of which is attached to the shaft 30, as better seen in Fig. 1. Except for the spring 37, the gear 35 is free to rotate relative to the shaft 30. The gear 35 meshes with a pinion 38 mounted on a shaft 39, Fig. 5, which is rotatably supported by the bracket 40 extending upwardly from the bearing plate 33. The pinion shaft 39 is operatively connected in any suitable manner, as by the splined connector 41, to a flexible shaft 42, Fig. 1, which shaft extends to and is rotatable by a manual adjusting knob 43 located on the instrument panel of the aircraft.

The spiral spring 37 is employed to bias the drag cup 25 through the shaft 30, and it will be obvious to those skilled in the art that the engine speed error detector can be so adjusted when first assembled that the spring 37 biases the drag cup to a position in which the vane 22 is centered relative to the photo-electric cells 2 and 3 when the magnet 26 applies no deflecting torque to the drag cup. After the error detector has been so adjusted initially, the manual knob 43 can be rotated to adjust the biasing torque to a predetermined amount in opposition to the deflecting torque which will be applied to the drag cup by the magnet of the speed sensor. The knob 43 is provided with a suitable calibrated dial, not shown, so that the biasing force established by adjustment of the knob can be made proportional to desired engine speed.

It is thus seen that the angular position of the drag cup 25, and therefore of the vane 22, depends upon the resultant of the biasing torque, which is proportional to desired engine speed, and the deflecting torque, which is proportional to true engine speed. If the deflecting force resulting from rotation of the magnet 26 predominates, then the vane 22 will be displaced to expose the photoelectric cell 3 to light from the source 20, resulting in operation of the motor M to increase the propeller pitch. If the biasing force resulting from adjustment of the knob 43 predominates, then the vane 22 will be displaced to expose the photoelectric cell 2 to light from the source 20, resulting in operation of the motor M to decrease the propeller pitch.

If the mask 21 were not present, then it is obvious that the apparatus as so far described would operate to give only a simple on-off control, and serious hunting would result. As will now be described, the mask 21 and its associated operating mechanism serve to convert such operation to a substantially proportional control, that is, to a controlling action in which the duration of energization of the motor M is made proportional to the existing engine speed error.

As seen in Fig. 4, the mask 21 is formed from a single piece of sheet metal and comprises two wings 21$^a$ and 21$^b$ spaced apart to provide the mask opening heretofore referred to and defined by the edges 23 and 24. The two wings are supported from a center plate 44 by means of arms 45 and 46. The plate 44 is provided with a central opening 47 to accommodate the shaft 30. Across the center plate 44 from the wings 21$^a$ and 21$^b$, there is provided a lever 48 secured to the arm 45, as by spot welding, and by means of which the mask is oscillated about the shaft 30, as will be described. The entire mask assembly just described is suspended by a bearing 49, Fig. 5, from the bearing plate 33 and, when so suspended, is free to oscillate relative to the shaft 30.

Figure 6:
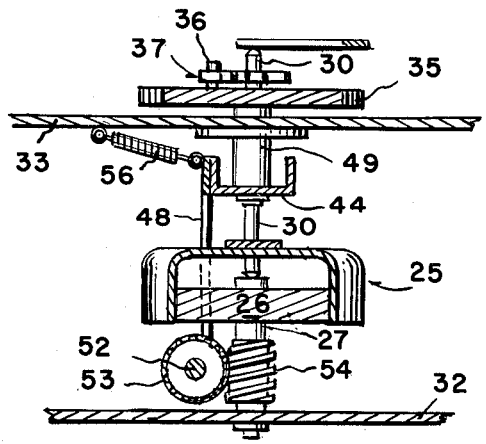
Fig. 6 is a vertical sectional view taken on the line 6—6, Fig. 5.

Extending parallel to the base panel 32 and rotatably supported by suitable bearings 50 and 51, Fig. 5, is a shaft 52. This shaft carries a gear 53 meshed with a worm 54 on the magnet drive shaft 27, as seen in Fig. 6, so that the shaft 52 is driven continuously by the aircraft engine. The shaft 52 extends parallel to the longitudinal axis of the mask 21 when the mask is centered relative to the photoelectric cells. Where the shaft 52 is adjacent the lower end of the lever 48, a cam 55 is provided, which cam may be a simple eccentric or a cam of more complex shape, as later explained. A tension spring 56 is connected at one end to the mask lever 48 and at the other end to the bearing plate 33, as seen in Figs. 5 and 6, in a position to urge the lever 48 into contact with the periphery of the cam 55.

It will be evident from the foregoing that, as the magnet shaft 27 is rotated by the engine-driven shaft 29, the cam shaft 52 is rotated through the gearing 53, 54, which is preferably a reduction gearing, so that the cam is rotated to oscillate the mask 21 transversely of the line of travel of light from the source 20 to the cells 2 and 3. The amplitude of oscillation of the mask is dependent upon the shape of the cam and the length of the effective lever arm 48 upon the shaft 30. While the total time period of oscillation of course is determined by the rate of rotation of the cam shaft, it will be obvious that the portion of the period of oscillation during which the mask is displaced from its centered position can be determined by choice of the shape of the cam surface.

When both the mask 21 and the vane 22 are centered relative to the cells 2 and 3, as seen in Fig. 8, it is necessary that no light reach either photocell. Therefore, the vane 22 is made sufficiently wider than the opening of the mask 21 that the vane effectively closes the opening of the mask to the passage of light. Since the mask is being oscillated continuously whenever the aircraft engine is operating, it is obvious that, if the amplitude of oscillation of the mask were relatively large, so that the opening of the mask moved past the edge of the vane, the photoelectric cells would be cyclically activated even though no speed error existed and the vane was centered. Such action would result in alternate cyclic energization of the pitch changing motor windings $i$ and $d$, which would obviously be undesirable. To avoid this condition, the total excursion of the mask opening, that is, of the space between the edges 23 and 24, is maintained within the boundaries of the centered position of the vane 22. Stated differently, the cam 55 and the lever 48 are preferably so designed that the amplitude of oscillation of the mask 21 is never greater than one half of the difference in widths of the mask opening and the vane. If this is true, then so long as no engine speed error exists, and the vane 22 is therefore centered as seen in Fig. 8, the continuous oscillation of the mask 21 will be ineffective to pass light from the source 20 to the photoelectric cells 2 and 3.

Figure 9:
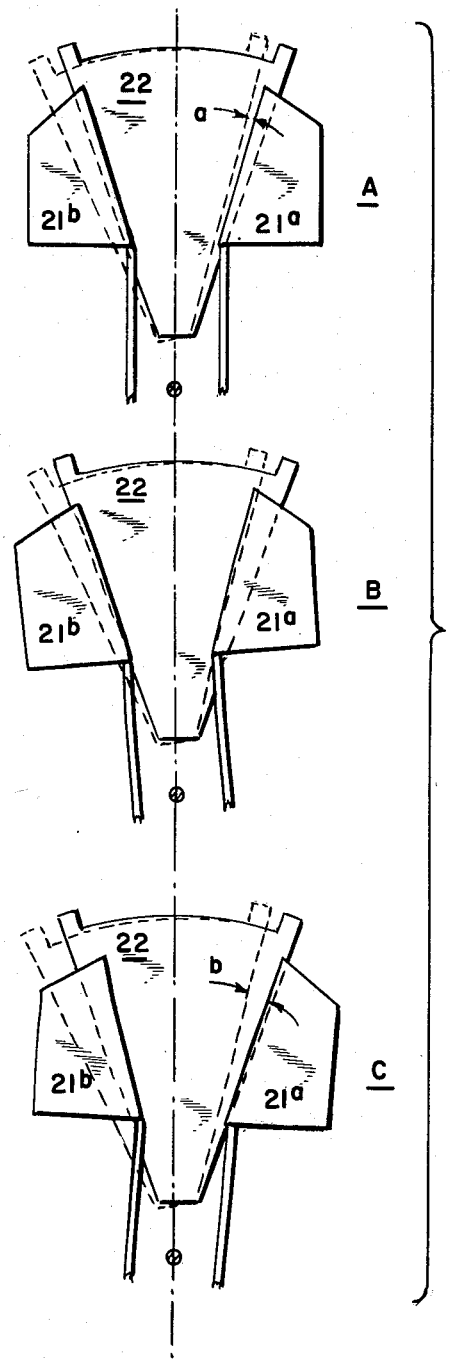
Fig. 9 is a diagram illustrating the relative positions of the light vane and mask at various stages in the operation of the governor.

This will be clear from inspection of Fig. 9, which shows the relative positions of the mask 21 and the vane at three successive stages, A, B and C, during oscillation of the mask. First referring only to the solid lines of Fig. 9, it will be seen that at stage A, when both the vane and the mask are centered, the opening of the mask lies entirely within the area of the vane. This is the stage of operation seen in Fig. 8, and it will be obvious that at this stage the mask and vane cooperate to prevent passage of light to the photoelectric cells. In stage B, the mask is seen at the limit of its travel to the left (as viewed in Fig. 9), and here it will again be noted that the opening of the mask is still covered by the vane, so that no light can pass. Again, in stage C, where the mask is seen at the limit of its travel to the right, the opening of the mask is still covered by the centered vane, and no light will pass. Thus, so long as there is no engine speed error and the vane 22 is therefore centered, light does not pass to the photocells at any stage of oscillation of the mask 21.

It should be understood that, while the foregoing relationship between the mask and the light vane is usually most desirable, under other conditions it may actually be preferable to have the mask and vane so designed that, when the vane is centered, continuous oscillation of the mask will cyclically energize both photoelectric cells, each for a very short equal period. Thus, there are specific instances when it may be desired to make the amplitude of oscillation of the mask 21 greater than one half of the difference in widths of the mask opening and the vane. For example, this may be advantageous where cyclic energization of the two photoelectric cells will serve to keep the system "free" and tend to overcome inertia of the moving parts.

Referring again to Fig. 9, it will be seen that the dotted lines therein show the vane 22 displaced to the left, as would be the result of excessive engine speed. Now it will be noted that, when the mask is centered at stage A, a portion $a$ of the opening of the mask remains unclosed by the vane and therefore free to pass light to one of the photoelectric cells. At stage B, the mask at the limit of its travel to the left, the opening of the mask is completely covered by the vane, and no light can reach either photoelectric cell. But, at stage C, with the mask at the limit of its travel to the right, a portion $b$ of the opening of the mask remains uncovered by the vane, and light can again pass to the corresponding photoelectric cell. Thus when an engine speed error exists and the vane 22 is displaced laterally, the mask 21, oscillating through its set amplitude, serves to cyclically interrupt the flow of light from the source 20 to the exposed photoelectric cell, thus causing current to be supplied to the corresponding winding of the pitch changing motor M in pulses, rather than continuously. And, of course, if the amplitude of oscillation of the mask is limited sufficiently, this cyclic interruption can be made to occur only when the speed error is small, so that current will be supplied continuously to the motor M for rapid pitch correction, when the speed error is large.

Figure 10:
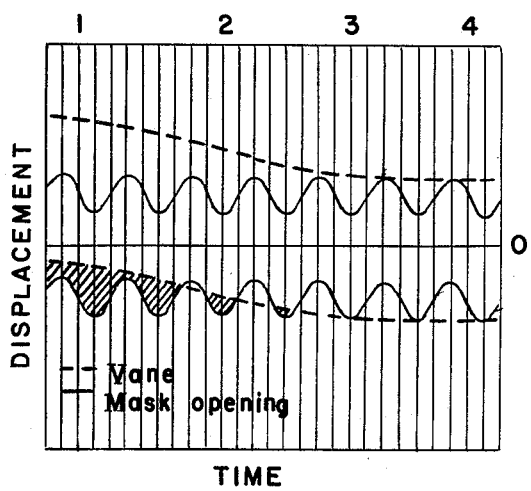
Fig. 10 is a graph showing the relationship of light shutters employed by the invention during operation thereof.

The action of the vane and mask in passing light from the source 20 to one of the photoelectric cells to correct an engine speed error is illustrated graphically in Fig. 10, wherein lateral displacement of the vane and the mask aperture are plotted against time. Here the positions of the edges of the vane 22 are represented by dashed lines, and the positions of the edges 23 and 24 defining the mask aperture are represented by solid lines. At a time $T_1$, the vane is laterally displaced, responsive to a speed error, an amount so large that oscillation of the mask is ineffective to interrupt the flow of light to the photoelectric cell exposed by the displaced vane. Thus, over the time period $T_1$—$T_2$, there is a continuous flow of light through the mask aperture to the cell, as indicated by the shaded portion of the graph in that area, and current is therefore applied continuously to the pitch changing motor to rapidly reduce the engine speed error. As the speed error decreases, the vane 22 swings back toward its centered position, and over the time range $T_2$—$T_3$ the vane displacement is sufficiently small that oscillation of the mask is effective to periodically interrupt the flow of light to the photoelectric cell, and current is applied to the pitch changing motor in pulses, rather than continuously. The last corrective pulse of current being just sufficient to change the propeller pitch to bring the engine "on speed," the vane is centered in the time range $T_3$—$T_4$, and then completely closes the mask aperture or opening, even though the mask is of course still oscillating.

The duration of the current pulse applied to the pitch changing motor is determined by the magnitude of the existing speed error, the shape of the cam 55 and the speed of rotation of the cam. The optimum pulse length depends upon the dynamics of various components of the system, including the engine, the relays, the pitch changing motor and the propeller. In actual practice with some existing systems, it has been found that excellent results are obtained when the cam is a simple eccentric. In some instances, however, it is desirable to employ a cam of different shape, so that the actual duration of the current pulse is other than proportional to the speed error, in order to compensate for the dynamics of the pitch motor and other working components of the system.

While it has been pointed out that the configuration and operation of the vane and mask can be made such as to provide constant energization of the pitch changing motor when a large speed error exists and to interrupt the controlling action as the speed error decreases, it will be understood that the amplitude of oscillation of the mask can be made sufficiently high that the controlling action is interrupted for speed errors of any magnitude.

The graph of Fig. 10 illustrates a situation in which several corrective current pulses are supplied to the pitch changing motor to correct a speed error. While this condition is the easiest to obtain, the optimum condition of the apparatus is one wherein a speed error, as soon as it occurs, will be corrected with only one current pulse. It has been found that the invention is capable of accomplishing this for a given set of flight conditions. That is, with the apparatus herein described, it is possible to obtain, for a given set of conditions, correction of a speed error during one half of the period of oscillation of the mask, as soon as the speed error occurs. Though this result will not obtain for all conditions of use of the apparatus, such capabilities of the invention are of obvious advantage in that the optimum adjustment of the apparatus can be made for the condition of use to which the apparatus is most usually subjected.

Figure 7:
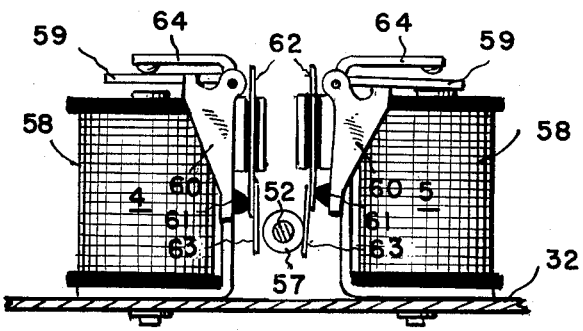
Fig. 7 is a vertical sectional view taken on the line 7—7, Fig. 5.

Referring to Figs. 5 and 7, it will be noted that the control relays 4 and 5 are mounted on the base panel 32 with the end of the cam shaft 52 extending between the two relays. The cam shaft 52 carries at its end a rotary contact drum 57 which forms a common contact in the normally open contact sets of the relays 4 and 5. As seen in Fig. 7, each of the relays 4 and 5 includes an actuating winding 58, an armature 59 and an operating lever 60 carried by the armature. Each operating lever 60 carries an insulating member 61 which bears against a spring arm 62 carrying a contact element 63. The spring arms 62 are each supported in any suitable manner on the corresponding relay frames 64, being insulated therefrom and are normally positioned by such supporting means to hold the contacts 63 out of contact with the drum 57. In each relay, when the winding 58 is energized, the armature is drawn downwardly, and the lever 60 is accordingly pivoted to bend the spring arm 62 until the contact 63 engages the rotating surface of the drum 57. In Fig. 7, the relay 4 is shown in normally open deenergized position, while the relay 5 is shown in energized or closed position. So long as the drum 57 is rotated, it is impossible for the contacts 63 of the relays to stick in closed position.

Figure 11:
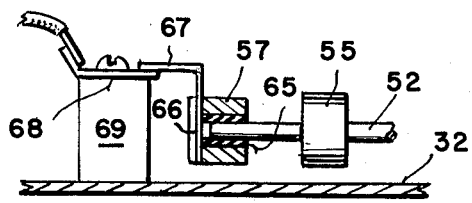
Fig. 11 is a fragmentary elevational view, partially in vertical section, of an improved contact structure employed in the mechanism shown in Figs. 5 and 7.

As seen in Fig. 11, the contact drum 57 is insulated from the shaft 52 by means of a suitable insulating bushing 65, and is connected into the relay circuit by means of a brush 66 which engages the end of the contact drum. The brush 66 is carried by a spring arm 67 secured to a connecting lug 68, the latter being spaced above the base panel 32 by an insulating post 69. The conductor 11, Fig. 1, is electrically connected to the lug 68.

Figure 2:
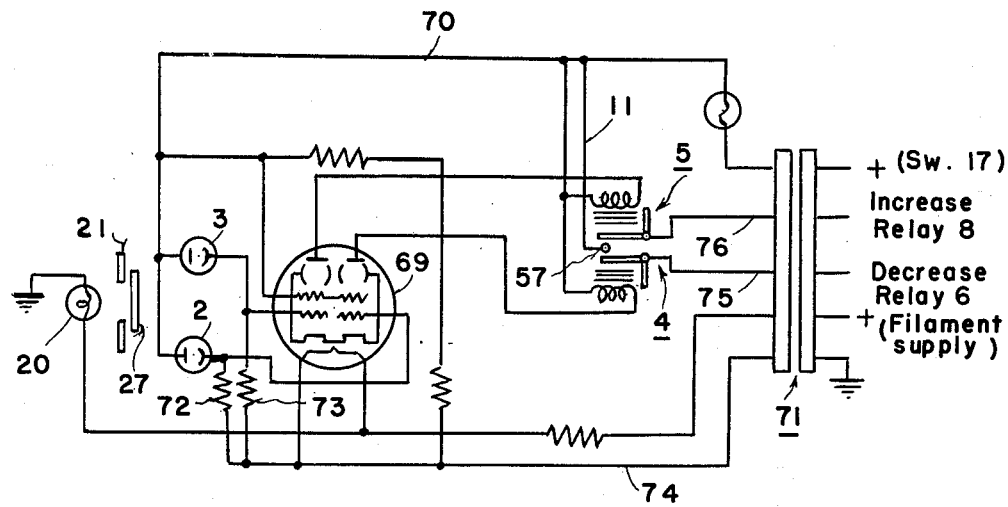
Fig. 2 is a schematic diagram of a preferred form of relay actuating circuit employed in the governor shown in Fig. 1.

One preferred arrangement of the relay actuating circuit 1 is shown in detail in Fig. 2. Here, the photoelectric cells 2 and 3, selectively activated by light from the lamp 20, control the grids of a conventional double beam amplifier tube 69, the plates of the tube being connected to the actuating coils of the control relays 4 and 5, respectively, and thence to the conductor 70. The conductor 70 is connected through a suitable multiple connector 71 to the manual switch 17, by which switch the conductor is connected to a suitable source of current. The photoelectric cells 2 and 3 are connected to the conductor 70 and, through suitable resistances 72 and 73, respectively, to ground via the conductor 74.

As has been described, the control relays 4 and 5 are biased to normally open position, and energization of their actuating windings pivots their movable contacts into engagement with the common contact constituted by the revolving drum 57. The contact drum 57 is connected to the power source via conductor 11, as previously explained, and the movable contacts of the relays 4 and 5 are connected by conductors 75 and 76 to the actuating windings of the decrease and increase power relays 6 and 8, respectively, through the connector 71.

While, in the preferred embodiment of the invention described, the mask 21 has been illustrated as lying between the light source 20 and the vane 22, it will be understood that the relative positions of the mask and vane can be reversed. Similarly, while the apertured mask 21 has been described as continuously oscillating and the vane 22 as being displaced in response to speed error, it will be clear that the apertured mask may be displaced in response to speed error and the vanes continuously oscillated.

I claim:

1. In a condition responsive control system for a reversible control motor, the combination of two light sensitive devices, means selectively controlled by said devices for operating the motor in one direction when one light sensitive device is activated and in the opposite direction when the other light sensitive device is activated, a light source for activating said light sensitive devices, two opaque shutter members interposed between said source and said light sensitive devices, means supporting said shutter members for independent oscillatory movement transversely of the light path from said light source to said light sensitive devices, condition responsive means operatively associated with one of said shutter members to move said one shutter member in one direction to expose one of said light sensitive devices to light from said source in response to an excess condition and in the opposite direction to expose the other of said light sensitive devices to light from said source in response to a deficiency condition, and power means independent of said condition responsive means and operatively connected to the other of said shutter members to continuously oscillate the same, whereby the flow of light from said source to either of said light sensitive devices exposed by movement of said first mentioned shutter member is cyclically interrupted to prevent said system from hunting.

2. In a condition responsive control system for a reversible control motor, the combination of two light sensitive devices; means selectively controlled by said devices for operating the motor in one direction when one of said light sensitive devices is activated and in the opposite direction when the other light sensitive device is activated; a light source spaced from the plane of said light sensitive devices; an opaque oscillatable mask interposed between said light source and said light sensitive devices, said mask having an opening through which light may pass from said source to both of said light sensitive devices when said mask is in a centered position relative to said light sensitive devices; an opaque oscillatable light vane interposed between said source and said light sensitive devices, said vane being of sufficient size to prevent the flow of light through the opening of said mask to said light sensitive devices when both said mask and said vane are centered relative to said devices; resilient means arranged to apply a biasing force to said vane in one direction tending to expose one of said light sensitive devices to light from said source; condition responsive means arranged to apply a deflecting force to said vane in opposition to said biasing force and tending to expose the other light sensitive device to light from said source, said vane being centered relative to said light sensitive devices only when said biasing and deflecting forces are equal; means for adjusting said resilient means to obtain a biasing force proportional to the desired value of the condition, and power means independent of said condition responsive means and operatively connected to said mask to continuously oscillate the same, whereby the flow of light from said light means to either of said light sensitive devices exposed by movement of said vane is cyclically interrupted to prevent said system from hunting.

3. In a follow-up system for maintaining a variable condition at a desired value, the combination of a reversible electric control motor; two photoelectric cells; a power circuit selectively controlled by said cells for operating said motor in one direction when one of said cells is activated and in the opposite direction when the other cell is activated; light means spaced from the plane of said cells; an opaque mask interposed between said light means and said cells, said mask having an opening through which light from said light means may pass to both of said cells when said mask is in a centered position relative to said cells; means mounting said mask for oscillatory movement transversely of the light path from said light means to said cells; an opaque oscillatable vane interposed between said light means and said cells, said vane being of sufficient size to prevent the flow of light through said opening to said cells when both said mask and said vane are centered; resilient means arranged to apply a biasing force to said vane in one direction tending to expose one of said cells to light from said light means; condition responsive means arranged to apply a deflecting force to said vane in opposition to said biasing force and tending to expose the other of said cells to light from said light means, said vane being centered relative to said cells only when said biasing and deflecting forces are equal; manually operable means for adjusting said resilient means to obtain a biasing force proportional to the desired value of the condition; a cam; means for continuously rotating said cam, and means acted upon by said cam and connected to said mask for continuously oscillating said mask to cyclically interrupt the flow of light from said light means to either of said cells exposed by movement of said vane.

4. In a speed responsive follow-up system, the combination of a reversible control motor; two photoelectric cells; means selectively controlled by said cells for operating said motor in one direction when one cell is activated and in the opposite direction when the other cell is activated; light means spaced from the plane of said cells; an opaque mask interposed between said light means and said cells; means mounting said mask for oscillatory movement transversely of the light path from said light means to said cells, said mask having an opening through which light may pass from said light means to both of said cells when said mask is in a centered position relative to said cells; an eddy current speed sensor including a rotary magnet and drag cup; an opaque light vane carried by said drag cup and interposed between said light means and said cells, said vane being of a size sufficient to prevent the flow of light through said opening to said cells when both said mask and vane are centered relative to said cells; resilient means arranged to apply a biasing torque to said drag cup in one direction tending to move said vane to expose one of said cells to light from said light means; means for adjusting said resilient means to obtain a torque proportional to desired speed; a rotary shaft connected to said magnet and adapted to be driven by the device controlled in a direction to apply to said drag cup a deflecting torque in opposition to said biasing torque proportional to true speed and tending to move said vane to expose the other of said cells to light from said light means; a cam driven by said rotary shaft, and means acted upon by said cam for continuously oscillating said mask to cyclically interrupt the flow of light from said light means to either of said cells exposed by movement of said vane.

5. In a follow-up system for maintaining a variable condition at a desired value, the combination of a reversible control motor, two photoelectric cells; power means controlled by said cells for operating said motor in one direction when one cell is activated and in the opposite direction when the other cell is activated; a light source for activating said cells; an opaque mask interposed between said source and said cells, said mask having an opening through which light from said source may pass to both of said cells when said mask is in a centered position relative to said cells; means mounting said mask for oscillatory movement transversely of the light path from said source to said cells; an opaque oscillatable light vane interposed between said source and said cells; resilient means arranged to apply a biasing force proportional to the desired value of the variable condition to said vane in a direction tending to expose one of said cells to light from said source; condition responsive means arranged to apply a deflecting force to said vane in opposition to said biasing force proportional to the true value of the variable condition and tending to expose the other of said cells to light from said source, and means for continuously oscillating said mask to cyclically interrupt the flow of light from said source to either of said cells exposed by movement of said vane, the opening of said mask being narrower than said vane and the amplitude of oscillation imparted to said mask being less than half of the difference in widths of said opening and said vane.

6. In a follow-up system for maintaining a variable condition at a desired value, the combination of a reversible control motor; two photoelectric cells; means selectively controlled by said cells for operating said motor in one direction when one cell is activated and in the opposite direction when the other cell is activated; a light source spaced from the plane of said cells; an opaque mask interposed between said source and said cells, said mask having an opening through which light from said source may pass to both of said cells when said mask is centered relative to said cells; an opaque light vane interposed between said source and said cells, said vane being of sufficient area to prevent the passage of light through said opening to said cells when both said mask and vane are centered relative to said cells; means mounting said mask and vane for oscillatory movement about a single axis and transversely of the light path from said source to said cells; resilient means arranged to apply a biasing force to said vane in a direction tending to expose one of said cells to light from said source; means for adjusting said resilient means to obtain a biasing force proportional to the desired value of the variable condition; condition responsive means arranged to apply a deflecting force to said vane in opposition to said biasing force and proportional to the true value of the variable condition, and means for continuously oscillating said mask to cyclically interrupt the flow of light from said source to either of said cells exposed by movement of said vane.

7. In a condition responsive control system, the combination of a reversible electric motor having forward and reverse windings, a first control relay having a contact set arranged to control said forward winding and a second control relay having a contact set arranged to control said reverse winding, two photoelectric cells, an actuating circuit selectively controlled by said cells and arranged to actuate said first relay to energize said forward winding when one cell is activated and to actuate said second relay to energize said reverse winding when the other cell is activated, a light source spaced from the plane of said cells, two opaque shutter members interposed between said source and said cells, means supporting said shutter members for independent oscillatory movement transversely of the light path of said source to said cells, condition rsponsive means operatively associated with one of said shutter members to move said one shutter member in one direction to expose one of said cells to light from said source in response to an excess condition and in the opposite direction to expose the other of said cells in response to a deficiency condition, a rotary shaft and means for continuously driving the same, a cam carried by said shaft, means acted upon by said cam arranged to continuously oscillate the other of said shutter members to cyclically interrupt the flow of light from said source to either of said cells exposed by movement of said first mentioned shutter member, and a rotary contact member carried by said shaft, said contact member being common to the contact sets of said control relays.

8. In a speed responsive follow-up system, the combination of a reversible electric control motor having forward and reverse windings, a first control relay having a contact set arranged to control said forward winding and a second control relay having a contact set arranged to control said reverse winding, two photoelectric cells, an actuating circuit selectively controlled by said cells and arranged to actuate said first relay to energize said increase winding when one of said cells is activated and to actuate said second relay to energize said reverse winding when the other of said cells is activated, a light source spaced from the plane of said cells, an eddy current speed sensor including a rotatable magnet and a drag cup, an opaque light vane carried by said drag cup and interposed between said source and said cells, resilient means arranged to apply a biasing torque to said drag cup in one direction tending to displace said vane to expose one of said cells to light from said source, a rotary shaft connected to said magnet and adapted to be driven by the device controlled in a direction to apply a deflecting torque to said drag cup tending to displace said vane to expose the other of said cells, a second rotary shaft and gear means driving the same from said first mentioned shaft, a cam carried by said second shaft, oscillatable shutter means interposed between said source and said cells, means operated by said cam for continuously oscillating said shutter means to cyclically interrupt the flow of light from said source to either of said cells exposed by movement of said vane, and a rotary contact member carried by said second shaft, said contact member being common to the contact sets of said control relays.

9. In a condition responsive control system for a reversible electric motor, the combination of two photoelectric cells, means selectively controlled by said cells for operating the motor in one direction when one of said cells is activated and in the opposite direction when the other of said cells is activated, a light source for activating said cells, two opaque shutter members interposed between said source and said cells, means supporting said shutter members for independent oscillatory movement transversely of the light path from said source to said cells, a rotatable control element arranged to control the position of one of said shutter members relative to said cells, resilient means arranged to apply to said control element a biasing torque in one direction tending to move said one shutter member to expose one of said cells to light from said source, condition responsive means arranged to apply to said control element a deflecting torque in opposition to said biasing torque and tending to move said one shutter member to expose the other of said cells, and means for continuously oscillating the other of said shutter members to cyclically interrupt the flow of light from said source to either of said cells exposed by movement of said one shutter member.

10. In a condition responsive control system for a reversible electric motor, the combination of two photoelectric cells; means selectively controlled by said cells for operating the motor in one direction when one of said cells is activated and in the opposite direction when the other of said cells is activated; a light source spaced from the plane of said cells, two opaque shutter members interposed between said source and said cells, one of said shutter members having a window through which light may pass to said cells when said one shutter member is centered relative to said cells and the other of said shutter members being wider than said window so that no light may pass through said window to said cells when both shutter members are centered; means supporting said shutter members for independent oscillatory movement transversely of the light path from said source to said cells; a rotatable control element arranged to control the position of one of said shutter members relative to said cells; resilient means arranged to apply to said control element a biasing torque in one direction tending to move said one shutter member to expose one of said cells to light from said source, condition responsive means arranged to apply to said control element a deflecting torque in opposition to said biasing torque and tending to move said one shutter member to expose the other of said cells, and means for continuously oscillating the other of said shutter members to cyclically interrupt the flow of light from said source to either of said cells exposed by movement of said one shutter member.

11. A control system constructed in accordance with claim 10 and in which said last means comprises a rotary cam, a cam lever connected to said other shutter member, and resilient means urging said lever into engagement with said cam, the effective length of said lever and the shape of said cam being such that the amplitude of oscillation imparted to said other shutter member is less than half of the difference in widths of said window and the cooperating shutter member.

12. In a device of the type described, the combination of two light sensitive devices, a light source for activating said light sensitive devices, two opaque shutter members interposed between said source and said light sensitive devices, means supporting said shutter members for independent oscillatory movement transversely of the light path from said source to said light sensitive devices, condition responsive means operatively associated with only one of said shutter members to move the same in either direction transversely of said light path for selective activation of said light sensitive devices, and power means independent of said condition responsive means and operatively connected to the other of said shutter members to continuously oscillate the same regardless of movement of said one shutter member, whereby the flow of light from said source to either of said light sensitive devices resulting from a movement of said one shutter member is cyclically interrupted.

13. In a device of the type described, the combination of two light sensitive devices; a light source spaced from the plane of said light sensitive devices; an opaque oscillatable mask interposed between said light source and said light sensitive devices, said mask having an opening through which light may pass from said source to both of said light sensitive devices when said mask is in a centered position relative to said light sensitive devices; an opaque oscillatable light vane interposed between said light source and said light sensitive devices, said vane being of sufficient size to prevent the flow of light through the opening of said mask to said light sensitive devices when both said mask and said vane are centered relative to said light sensitive devices; means operatively associated with said vane to move the same in either direction laterally of the path of light from said source to said light sensitive devices for selective activation of said devices, and means for continuously oscillating said mask to cyclically interrupt the flow of light from said source to either of said light sensitive devices exposed by movement of said vane.

14. A device of the type described constructed in accordance with claim 13 and wherein the opening of said mask is narrower than said vane and the amplitude of oscillation imparted to said mask is less than one half of the difference in widths of said opening and said vane.

15. In a device of the type described, the combination of two photoelectric cells; light means spaced from the plane of said cells; an opaque mask interposed between said light means and said cells, said mask having an opening through which light from said light means may pass to both of said cells when said mask is in a centered position relative to said cells; means mounting said mask for oscillatory movement transversely of the light path from said light means to said cells; an opaque oscillatable vane interposed between said light means and said cells, said vane being of sufficient size to prevent the flow of light through said opening to said cells when both said mask and said vane are centered; means operatively associated with said vane to deflect the same in either direction transversely of said path for selective activation of said cells; a cam; means for continuously driving said cam, and means acted upon by said cam and connected to said mask for continuously oscillating said mask to cyclically interrupt the flow of light from said light means to either of said cells exposed by movement of said vane.

16. In a speed responsive follow-up system, the combination of two photoelectric cells; light means spaced from the plane of said cells; an opaque mask interposed between said light means and cells; means mounting said mask for oscillatory movement transversely of the light path from said light means to said cells, said mask having an opening through which light may pass from said light means to both said cells when said mask is in a centered position relative to said cells; an eddy current speed sensor including a rotary magnet and drag cup; an opaque light vane carried by said drag cup and interposed between said light means and said cells, said vane being of such size as to prevent the flow of light through said opening to said cells when both said mask and vane are centered relative to said cells; resilient means arranged to apply a biasing torque to said drag cup in one direction tending to move said vane to expose one of said cells to light from said light means; a rotary shaft connected to said magnet to drive the same in a direction to apply to said drag cup a deflecting torque in opposition to said biasing torque and thus tending to move said vane to expose the other of said cells to light from said light means; a cam driven by said rotary shaft, and means acted upon by said cam for continuously oscillating said mask to cyclically interrupt the flow of light from said light means to either of said cells exposed by movement of said vane.

17. In a system of the type described, the combination of two control relays, two light sensitive devices, circuit means connecting said light sensitive devices to control said relays, a light source spaced from the plane of said light sensitive devices, two opaque shutter members interposed between said source and said light sensitive devices, means supporting said shutter members for independent oscillatory movement transversely of the light path from said source to said light sensitive devices, means operatively associated with one of said shutter members to move the same in either direction transversely of said light path for selective activation of said light sensitive devices, a rotary shaft and means for continuously driving the same, a cam carried by said shaft, means acted upon by said cam and arranged to continuously oscillate the other of said shutter members to cyclically interrupt the flow of light from said source to either of said light sensitive devices exposed by movement of said first mentioned shutter member, and a rotary contact member carried by said shaft, said contact member being common to the contact sets of said control relays.

18. In a speed responsive follow-up system, the combination of two photoelectric devices; two control relays; circuit means connecting said photoelectric devices to control said relays; a light source spaced from the plane of said photoelectric devices; an opaque mask interposed between said source and said photoelectric devices; means mounting said mask for oscillatory movement transversely of the light path from said source to said photoelectric devices, said mask having an opening through which light may pass from said source to both of said photoelectric devices when said mask is centered relative to said devices; an eddy current speed sensor including a rotary magnet and drag cup; an opaque light vane carried by said drag cup and interposed between said source and said photoelectric devices, said vane being of such size as to prevent the flow of light through said opening to said devices when both said mask and vane are centered relative to said devices; resilient means arranged to apply a biasing torque to said drag cup in one direction tending to move said vane to expose one of said photoelectric devices to light from said source; a rotary shaft connected to said magnet to drive the same in a direction to apply to said drag cup a deflecting torque in opposition to said biasing torque and thus tending to move said vane to expose the other of said photoelectric devices to light from said source; a second rotary shaft and gear means driving the same from said first mentioned shaft; a cam carried by said second shaft; means acted upon by said cam and connected to said mask for continuously oscillating said mask to cyclically interrupt the flow of light from said source to either of said photoelectric devices exposed by movement of said vane, and a rotary contact member carried by said second shaft, said contact means being common to the contact sets of said control relays.

19. In a device of the type described, the combination of two light sensitive devices; a light source spaced from the plane of said light sensitive devices; two opaque shutter members interposed between said source and said light sensitive devices, one of said shutter members having a window through which light may pass to both of said light sensitive devices when said one shutter member is centered relative to said devices, and the other of said shutter members being wider than said window so that no light may pass through said window to said light sensitive devices when both shutter members are centered; means supporting said shutter members for independent oscillatory movement transversely of the light path from said source to said light sensitive devices; a rotatable control element operatively associated with one of said shutter members to move the same in either direction transversely of the path of light from said source to said light sensitive devices for selective activation of said devices; a rotary cam; a cam lever connected to one of said shutter members, and resilient means urging said lever into engagement with said cam, the effective length of said lever and the shape of said cam being such that the amplitude of oscillation imparted to said one shutter member by said cam is less than half of the difference in width of said window and the cooperating shutter member.

References Cited in the file of this patent

UNITED STATES PATENTS

| | | |
|---|---|---|
| 1,973,468 | Denis | Sept. 11, 1934 |
| 1,999,646 | Wittkuhns | Apr. 30, 1935 |
| 2,154,500 | Elmendorf | Apr. 18, 1939 |
| 2,216,472 | Harrison | Oct. 1, 1940 |
| 2,319,406 | Jones | May 18, 1943 |
| 2,334,967 | Thomas et al. | Nov. 23, 1943 |
| 2,357,055 | Mydans | Aug. 29, 1944 |
| 2,361,973 | Smith | Nov. 7, 1944 |
| 2,365,601 | Sipman | Dec. 19, 1944 |
| 2,386,294 | Coss et al. | Oct. 9, 1945 |
| 2,440,083 | Gley | Apr. 20, 1948 |

FOREIGN PATENTS

| | | |
|---|---|---|
| 587,055 | Great Britain | Apr. 11, 1947 |